(12) United States Patent
Hopkins

(10) Patent No.: US 6,559,431 B2
(45) Date of Patent: May 6, 2003

(54) MICROWAVE COOKING TRAY AND SLEEVE ASSEMBLY

(75) Inventor: Gary L. Hopkins, Scottsburg, IN (US)

(73) Assignee: Steamway Franchise Sales, Inc., Scottsburg, IN (US)

( * ) Notice: Subject to any disclaimer, the term of this patent is extended or adjusted under 35 U.S.C. 154(b) by 0 days.

(21) Appl. No.: 10/028,622

(22) Filed: Dec. 20, 2001

(65) Prior Publication Data

US 2002/0096056 A1 Jul. 25, 2002

Related U.S. Application Data
(60) Provisional application No. 60/263,686, filed on Jan. 23, 2001.

(51) Int. Cl.[7] .............................. H05B 6/80; A23L 1/01
(52) U.S. Cl. ...................... 219/735; 219/734; 426/118; 426/234; 99/DIG. 14; 229/903
(58) Field of Search ............................... 219/734, 735, 219/725, 729, 762; 426/107, 118, 234, 113, 241, 243; 99/DIG. 14; 229/903, 902, 904

(56) References Cited

U.S. PATENT DOCUMENTS

| | | | | |
|---|---|---|---|---|
| 2,633,284 A | * | 3/1953 | Moffett et al. ............... 426/118 |
| 3,835,281 A | * | 9/1974 | Mannix ...................... 219/734 |
| 4,013,798 A | | 3/1977 | Goltsos ...................... 426/107 |
| 4,058,214 A | * | 11/1977 | Mancuso ..................... 206/545 |
| 4,140,889 A | | 2/1979 | Mason, Jr. et al. ... 219/10.55 E |
| 4,286,136 A | | 8/1981 | Mason, Jr. ............ 219/10.55 E |
| 4,317,017 A | | 2/1982 | Bowen ................ 219/10.55 E |
| 4,416,906 A | | 11/1983 | Watkins ...................... 426/107 |
| 4,425,368 A | | 1/1984 | Watkins ...................... 426/107 |
| 4,481,392 A | | 11/1984 | Nibbe et al. .......... 219/10.55 E |
| 4,529,089 A | | 7/1985 | Gasbarra et al. ............ 206/525 |
| 4,560,850 A | | 12/1985 | Levendusky et al. . 219/10.55 E |
| 4,818,831 A | * | 4/1989 | Seaborne .................... 219/730 |
| 4,834,247 A | * | 5/1989 | Oshima et al. ............. 206/631 |
| 4,873,406 A | | 10/1989 | Connor ................ 219/10.55 E |
| 4,916,280 A | | 4/1990 | Havette ............... 219/10.55 E |
| 4,923,704 A | | 5/1990 | Levinson .................... 426/243 |
| 5,005,703 A | | 4/1991 | Bodker ....................... 206/563 |
| 5,310,981 A | | 5/1994 | Sarnoff et al. .............. 219/731 |
| 5,352,465 A | | 10/1994 | Gondek et al. ............... 426/87 |
| 5,370,042 A | | 12/1994 | Tolchin et al. ................ 99/417 |
| 5,521,361 A | | 5/1996 | Strait, Jr. .................... 219/731 |
| D378,178 S | | 2/1997 | Sawyer ........................ D7/359 |
| 5,750,967 A | | 5/1998 | Sprauer, Jr. ................. 219/735 |
| 5,797,312 A | | 8/1998 | Brant .......................... 99/415 |
| D420,584 S | | 2/2000 | Hopkins ...................... D9/423 |

FOREIGN PATENT DOCUMENTS

EP    0955246    11/1999    ........... B65D/81/34

* cited by examiner

*Primary Examiner*—Philip H. Leung
(74) *Attorney, Agent, or Firm*—Stites & Harbison, PLLC; David W. Nagle, Jr.

(57) ABSTRACT

A Microwave Cooking Tray and Sleeve Assembly comprises a tray for holding food to be cooked, a transparent heat seal covering the tray, and a sleeve designed to hold the tray. In order to cook the food in the tray, the assembly is placed in a microwave oven. During cooking, side vents on the tray channel steam out of the tray. Holes in the sleeve allow the steam to easily escape the box after passing through the vents in the tray. After a short period of cooking in the microwave oven, the tray is removed from the sleeve, the heat seal is removed from the tray, and the food in the tray is ready to eat.

11 Claims, 8 Drawing Sheets

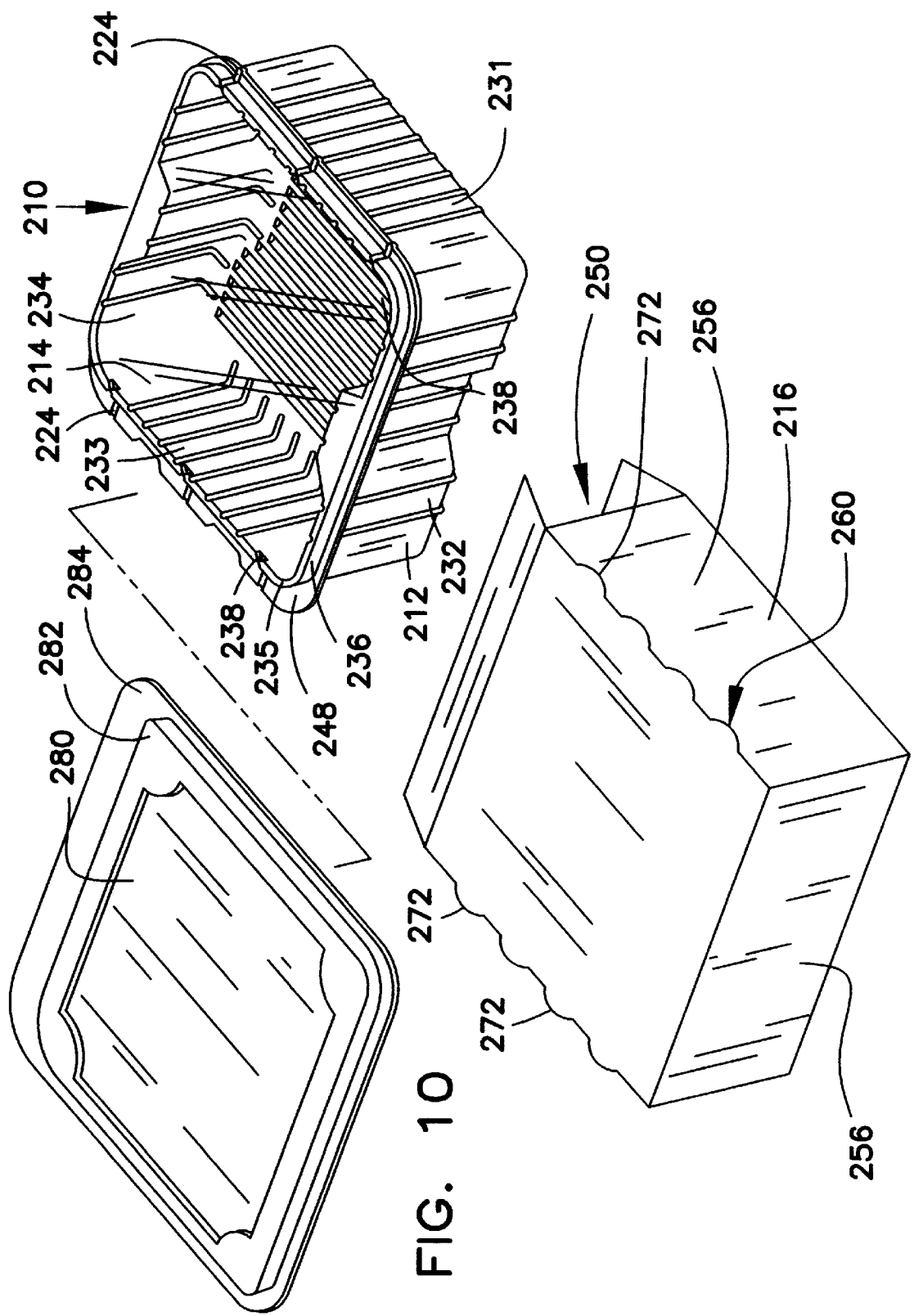

MICROWAVE COOKING TRAY AND SLEEVE ASSEMBLY

CROSS-REFERENCE TO RELATED APPLICATIONS

This application claims the benefit of U.S. Provisional Application No. 60/263,686 Jan. 23, 2001.

BACKGROUND

The present invention relates to the field of cooking devices. More particularly, the present invention relates to a steam tray for use in a microwave oven for cooking meats, vegetables, and other food products.

Consumers often prefer to cook food in a microwave oven rather than conventional ovens because of the reduced cooking time required to heat foods in a microwave oven. Unfortunately, cooking desirable and tasty food in a microwave oven can be a difficult task. Foods cooked in a microwave oven tend to be tough and/or dry in texture and consistency rather than tender and moist. When liquid is added to the food in an attempt to retain moisture, the food can become soggy and undesirable. In addition, microwave ovens do not evenly distribute heat to the product being cooked. This results in a cooked food product that may be very hot in one area, but cold in another area. Because of these problems, many people consider microwave cooking to be problematic and generally undesirable.

One method for improving the texture and consistency of food cooked in a microwave oven is to use steam generated by the heated food product to assist in cooking the food. Cooking with steam not only provides moisture for the food being cooked, but also results in more consistent heating throughout the food product. In order to retain steam in a cooking container when cooking food in a microwave oven, the container must be at least partially sealed. A lid covering the cooking container is often used to provide such a complete or partial seal.

When a container is sealed and used in a microwave oven, heat, steam and pressure build rapidly within the container. Of course, this rapid build up of heat, steam and pressure only continues to build until the container holding the food must somehow be relieved of the pressure. This relief often comes in the form of an explosion of the lid from the container. When the lid explodes from the container, food is typically spewed from the container, resulting in a mess on the inside of the microwave oven. In addition to the mess, the explosion also thwarts the efforts to use steam to cook the food within the container because the container is no longer sealed. Because the container is not sealed, all pressure within the container is lost, and heat and steam flow freely out of the container. Thus, for effective steam cooking of food within a microwave oven, a sealed container having a pressure relief system is desirable.

While a sealed container having a pressure relief system is desirable for cooking food in a microwave oven, many consumers do not want to hassle with transferring food into a special container for microwave cooking. This is especially true of pre-packaged food products, such as frozen food dinners, purchased by consumers for the express purpose of rapid heating in a microwave oven to produce a quick meal for the consumer. Consumers purchasing pre-packaged food products want a safe, convenient and tasty meal that can be prepared in a very short amount of time. Consumers also want to be provided the opportunity to cook pre-packaged food products in the packaged they were purchased in without the hassle of transferring the food from one container to the next.

Another problem with pre-packaged meals such as frozen dinners is that the packages that the dinners come in must be prepared before the food can be cooked. For example, when cooking frozen dinners, trays must typically be removed from a box that holds the tray. In addition, holes must be poked in the film that covers the tray. As mentioned above, if a hole is not poked in the film, the film may explode from the tray during cooking, resulting in a mess. Therefore, it would be desirable to provide a pre-packaged frozen dinner that may be transferred directly from the freezer to the microwave without the hassle of removing the frozen dinner from a box or poking holes in film that covers the tray containing the food.

Accordingly, it would be desirable to produce a sealed container having a pressure relief system allowing excess pressure to be removed from the container when cooking food in a microwave oven. It would also be desirable if such container were cheap and inexpensive to produce such that it could be used with pre-packaged food products, such as frozen dinners. It would be further advantageous if the container could be transferred directly from the freezer to the microwave without the need for additional preparation before cooking.

SUMMARY

A microwave cooking tray and sleeve assembly comprises a plastic tray for retaining pre-packaged foods, such as a frozen dinner. The tray includes at least one sidewall that defines a tray interior where the food is retained. The at least one sidewall is bounded by a rim that provides a surface along the top of the sidewall. A plastic film material provides a heat seal that is attached to the rim and covers the tray interior. The film is hermetically sealed to the tray and thus provides an air tight package for the food in the tray before it is cooked. At least one vent is positioned upon the rim of the tray. The vent creates a weakened portion on the heat seal.

The apparatus also includes a cardboard sleeve for holding the tray. The sleeve is designed to protect the tray during shipping and other handling before cooking, and is also designed for use when cooking the tray. The sleeve includes a sleeve top, at least one sleeve side and at least one port. When the tray is held by the sleeve, the sleeve top is positioned against the heat seal and the rim is positioned against the at least one sleeve side. Also, the at least one port is aligned with the at least one vent when the tray is retained within the sleeve.

When the consumer desires to cook the food in the tray for consumption, the consumer takes the tray and sleeve assembly and places the entire assembly in a microwave oven. When the microwave oven generates radiant energy, it travels through the sleeve and tray and heats the food positioned in the tray. As the food cooks, it gives off water vapor and steam is generated. The steam and heat from cooking the food causes pressure to build in the hermetically sealed tray. As the pressure continues to build, the vents direct pressure at the weakened portion of the heat seal. Because the size of the rim is reduced at the vents, the hermetic seal between the rim and the heat seal is weakest at this point. Thus, pressure inside the tray causes the seal to first break completely away from the rim near the vents. When the seal breaks, an opening in the seal is created and steam and heat escape from the tray at the vents. Because the ports in the sleeve are directly aligned with the weakened portion of the seal and the vents, the steam generated during cooking is allowed to escape the sleeve through the ports.

Accordingly, the present invention provides a sealed container having a pressure relief system allowing excess pressure to be removed from the container when cooking food in a microwave oven. The container is also cheap and inexpensive to produce such that it may be used with pre-packaged food products, such as frozen dinners. The assembly also be transferred directly from the freezer to the microwave without the need for additional preparation before cooking.

BRIEF DESCRIPTION OF THE DRAWINGS

FIG. 10 shows a perspective view of a second alternative embodiment of the microwave cooking tray and sleeve assembly with the tray removed from the sleeve and the assembly also including a rigid lid.

DESCRIPTION

Figure 1:
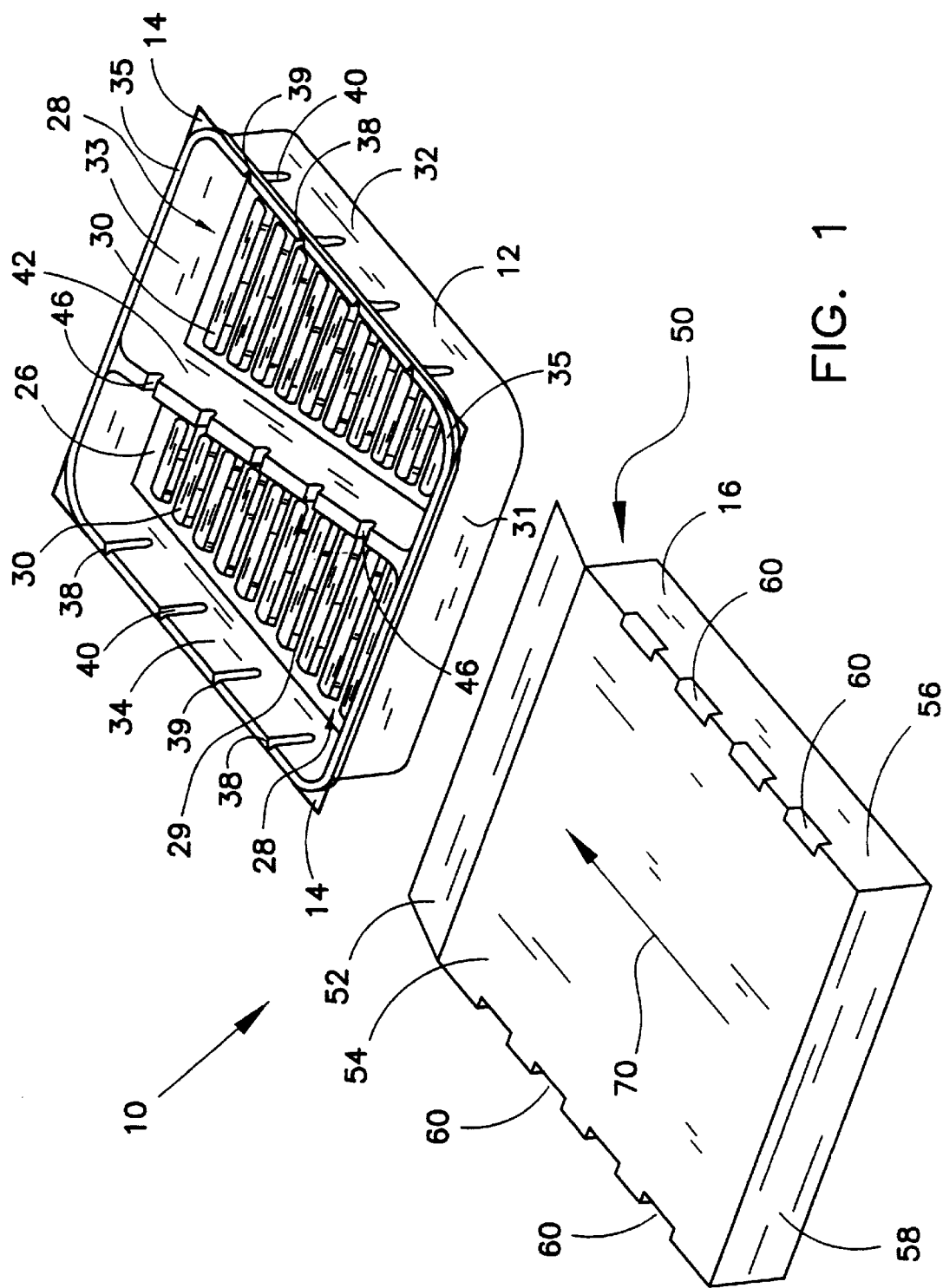
FIG. 1 shows a perspective view of a microwave cooking tray and sleeve assembly with the tray removed from the sleeve.

With reference to FIGS. 1–4, a Microwave Cooking Tray and Sleeve Assembly 10 comprises a tray 12 for holding food to be cooked, a clear film heat seal 14 covering the tray, and a sleeve 16 designed to hold the tray. When cooking food in a microwave oven using the tray 12, vents 40 on the tray channel steam out of the tray. Holes 60 in the sleeve 16 allow the steam to easily escape the sleeve after passing through the V-shaped indentations 38 in the tray. After a short period of cooking in the microwave oven, the tray 12 is removed from the sleeve 16, the heat seal 14 is removed from the tray 12, and the food in the tray is ready to eat.

The tray 12 is made of a thermo-formed co-polymer polypropylene quality food grade plastic. The tray is transparent to radiant energy, such as energy from a microwave oven. The phrase "transparent to radiant energy" is used herein to mean that radiant energy passes through the material so that the food within the tray receives the radiant energy, and the material does not completely block the radiant energy from the food. The tray 12 comprises a bottom surface 26 with four sidewalls 31–34 extending therefrom to define a tray interior 28. A plurality of ribs 30 are raised from the bottom surface 26 to provide a cooking plane above the bottom surface 26. The ribs terminate near the interior edges of the tray before reaching the four sidewalls. Steam channels 29 are formed between the ribs 30, such that steam produced while cooking food in the tray travels all around the food cooked in the tray, including underneath the food.

Figure 2:
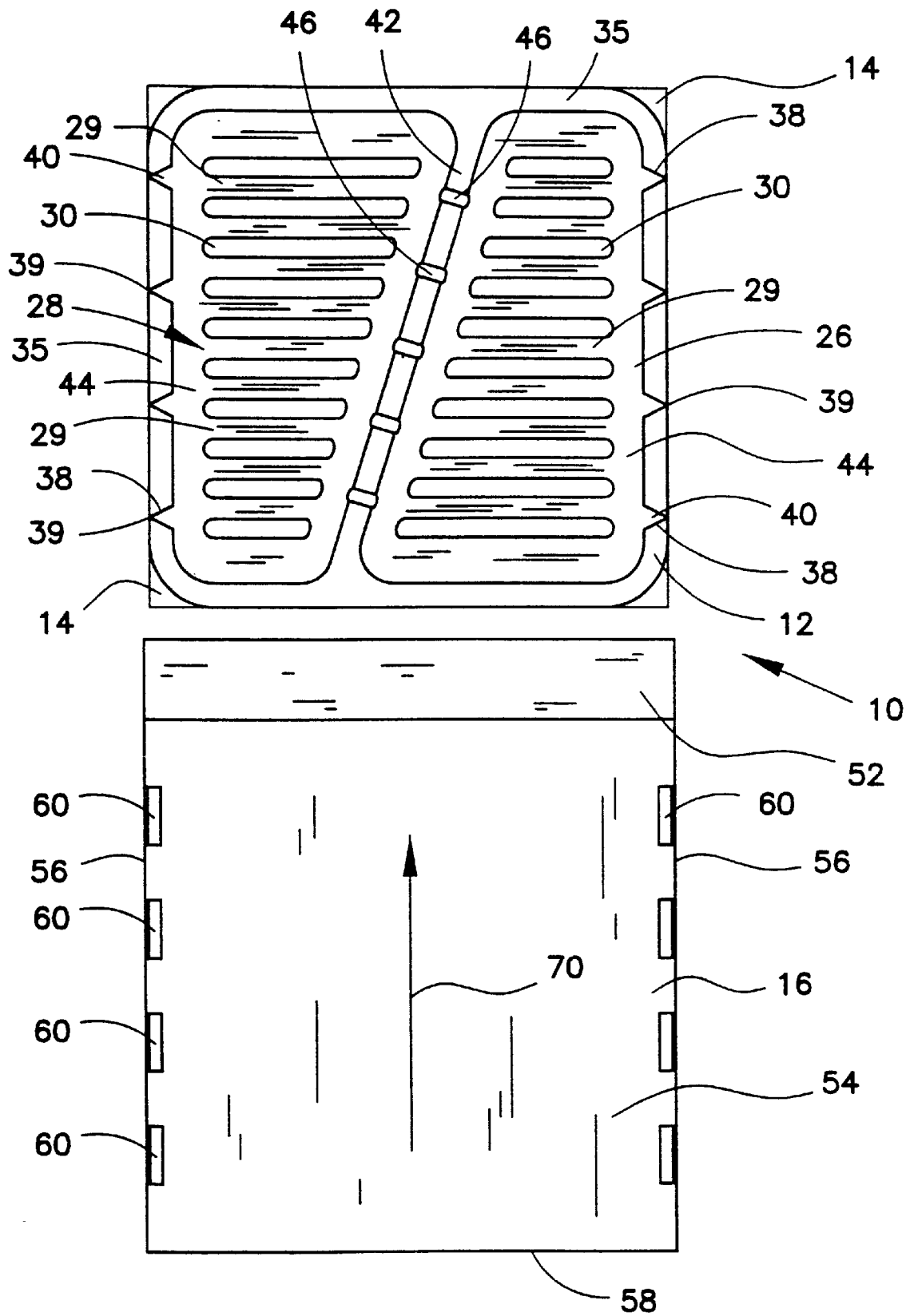
FIG. 2 shows a top view of the microwave cooking tray and sleeve assembly of FIG. 1.
Figure 3:
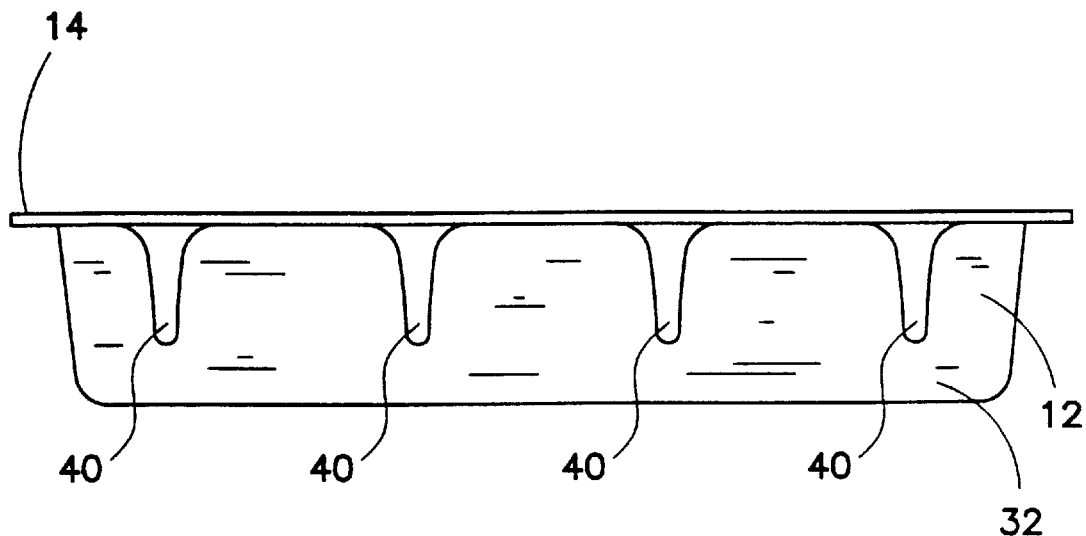
FIG. 3 shows a side view of the tray of FIG. 1.
Figure 4:
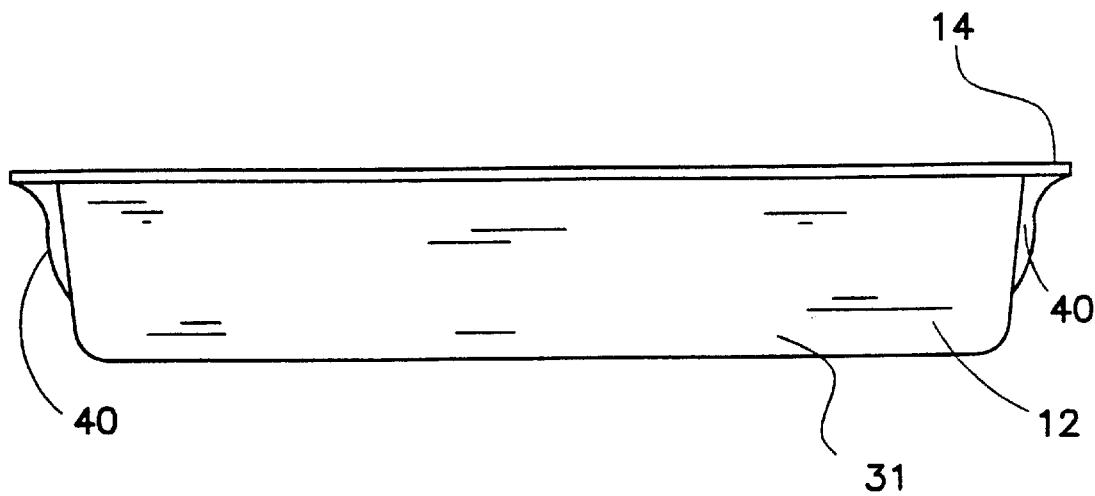
FIG. 4 shows another side view of the tray of FIG. 1.
Figure 5:
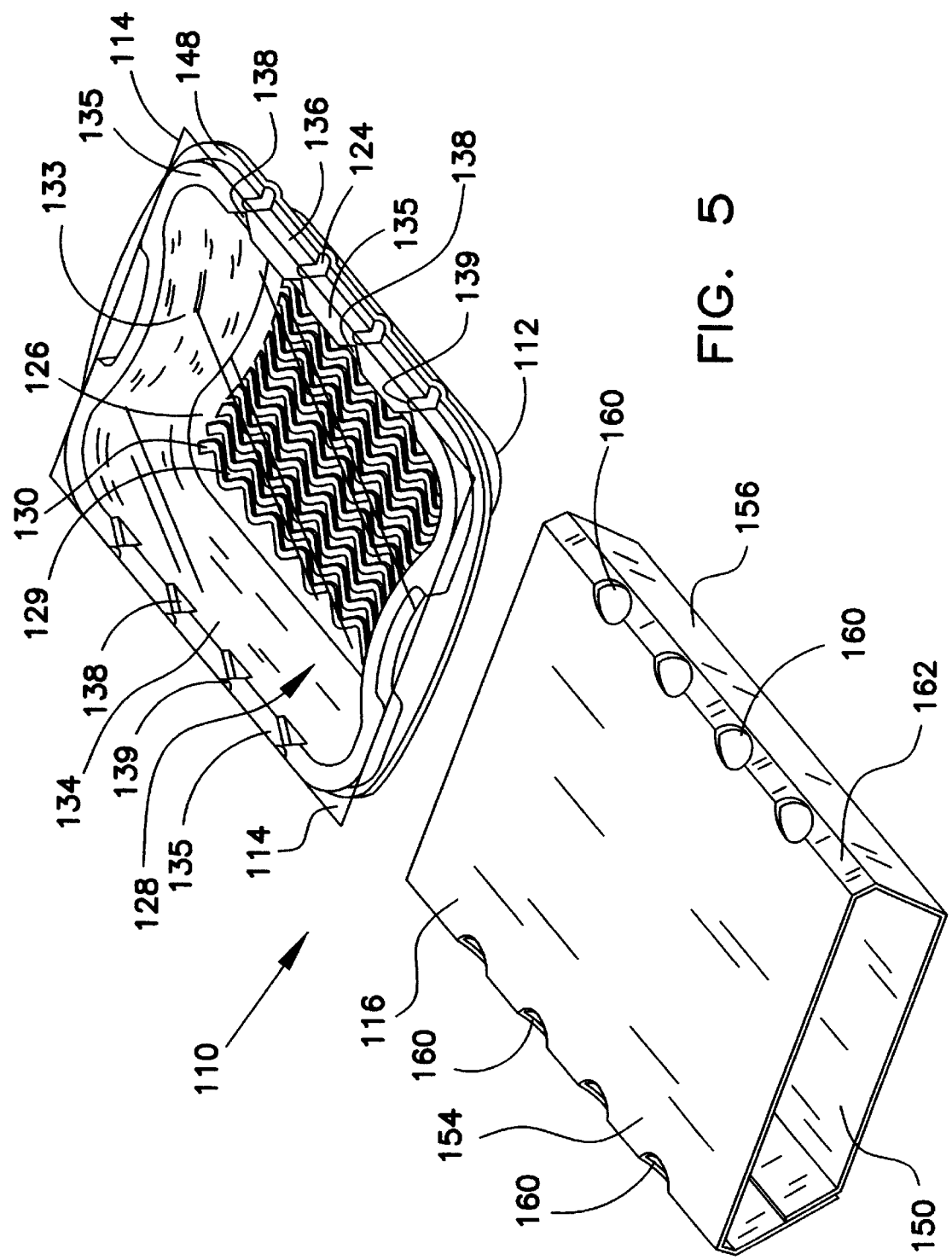
FIG. 5 shows a perspective view of a first alternative embodiment of the microwave cooking tray and sleeve assembly with the tray removed from the sleeve.
Figure 6:
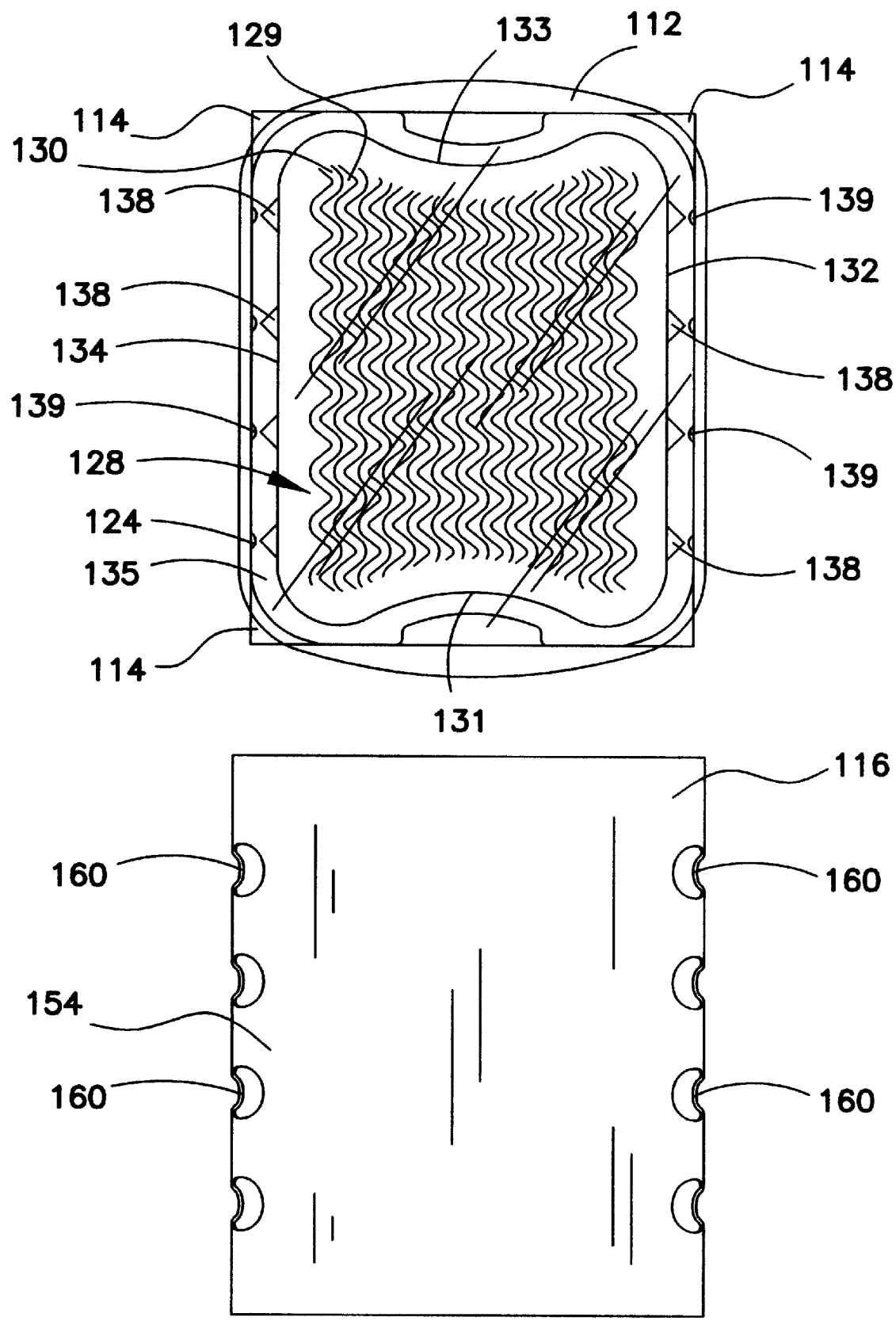
FIG. 6 shows a top view of the microwave cooking tray and sleeve assembly of FIG. 5.
Figure 7:
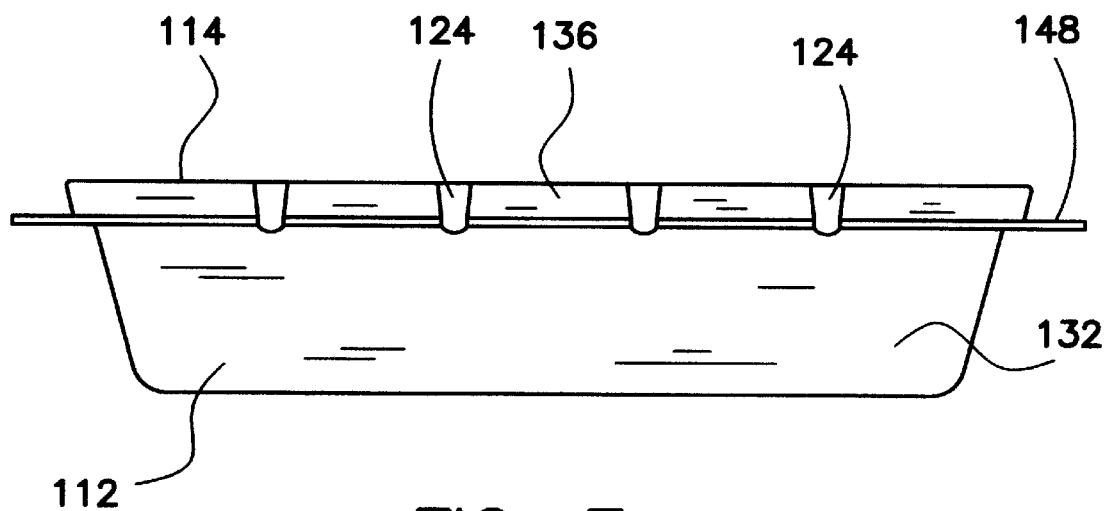
FIG. 7 shows a side view of the tray of FIG. 5.

The four sidewalls 31–34 are bounded by a rim providing a top surface for the four sidewalls. As shown in FIGS. 1 and 2, the rim 35 in this embodiment of the invention extends outward from and encircles the top of the four sidewalls. Vents 40 are formed in the rim at two of the opposing sidewalls. The vents 40 each include a V-shaped indentation 38 in the rim and a channel extending beneath the V-shaped indentation and tapering into the sidewall. Eight vents 40, including eight V-shaped indentations are shown in FIGS. 1 and 2. The V-shaped indentations 38 extend into the rim with the tip 39 of the "V" ending just before the edge of the rim. Thus, a small portion of the rim 35 extends around each V-shaped indentation 38 such that the rim is continuous around the four sidewalls 31–34 and not completely interrupted by the V-shaped indentations. The channel portion of the vents 40 are formed in the sidewalls 31–34 below each of the V-shaped indentations 38. The channel portion of the vents 40 taper out from the middle portion of the sidewalls and feed into the profile of the V-shaped indentations 38.

A dividing wall 42 is provided in the tray interior 28. The dividing wall 42 extends between two opposing sidewalls 32 and 34 to split the tray interior 28 into two trapezoidal chambers 44. Of course, multiple dividing walls may also be used to split the tray interior into different sized and shaped compartments. The dividing wall 42 includes grooves 46 placed upon the top of the dividing wall 42 for providing a passage between the two chambers, thereby allowing heat and steam to be communicated between the chambers.

The heat seal 14 is a food grade plastic film used to cover the tray 12. The heat seal 14 is also transparent to radiant energy. The heat seal 14 is typically 2 or 3 mils in thickness, but various film thicknesses may be used. The heat seal 14 is hermetically sealed to the tray 12 along the rim 35 after food is packed in the tray. The heat seal 14 provides a cover for the tray and keeps the food in an air-tight container until the seal is manually removed by a consumer or hermetic seal is broken when the food in the assembly is cooked. The strength of the hermetic seal between the rim 35 and the heat seal 14 is weakest near the tip of the V-shaped indentations because this is the smallest area on the rim for the heat seal to be attached to the rim. As explained in more detail below, this weakened portion of the heat seal is designed to be the first portion of the heat seal to rupture or tear away from the rim while cooking food in the tray, thereby allowing steam to pass through the tray.

The sleeve 16 is a box-shaped container made of cardboard or a similar paper product that is also transparent to radiant energy. The sleeve 16 includes a sleeve top 54, two depending sleeve sides 56, a sleeve bottom (not shown), and a sleeve back 58. An opening 50 is also provided at the front of the sleeve 16 and a flap 52 is attached to the top 54 of the sleeve above the opening. The flap 54 may be used to cover the opening 50 when the tray 12 is placed inside of the sleeve 16. Ports 60 in the form of holes in the sleeve 16 are placed in the top 54 of the sleeve along the two sides 56. The ports 60 also extend slightly down the sides 56 of the sleeve. The ports 60 provide passages from the inside of the sleeve 16 to the outside of the sleeve, but are not large enough to allow the tray to enter the sleeve. Thus, the diameter of each port is smaller than the diameter of each sidewall (i.e., the distance from one side of the tray to the opposite side, typically measured as the length of one sidewall). The opening 50 is the feature designed for allowing the tray to enter the sleeve, while the ports are designed for allowing steam to pass through the assembly while retaining the heat seal in place.

The sleeve 16 is designed to contain the tray 12 and snugly hold the tray within the sleeve. When the tray 12 is placed in the sleeve 16, the tips 39 of the V-shaped indentations 38 are aligned with and point to the ports 60 in the sleeve. Accordingly, the weakened portion of the heat seal 14 is also aligned with the ports 60 in the sleeve. The top 54 of the sleeve 16 fits against the heat seal 14 which is sealed to the rim 35 of the tray. Also, the rim 35 is closely positioned to the sides 56 of the sleeve 16 when the tray 12 is placed in the sleeve. The snug positioning of the tray 12 in the sleeve 16 provides very little room for the tray 12 to move in the sleeve 16.

The assembly 10 is used to package foods for preparation by a consumer in a microwave oven. During packaging, the food distributor places food products in the various tray compartments 44 (i.e., the trapezoidal chambers form the compartments in FIGS. 1–4). Different types of food are typically placed in differing compartments 44. For example, a meat product may be placed in one compartment and a vegetable may be placed in another compartment. After the food is arranged in the tray, the heat seal 14 is placed over the tray and hermetically sealed to the rim 35 to provide an air tight compartment in the tray interior 28. Next, the sealed tray 12 is placed in the cardboard sleeve 16 by sliding the cardboard sleeve over the tray in the direction of arrow 70. The opening 50 in the tray allows the tray to slide directly into the sleeve. After the tray is inserted into the sleeve, the opening may be closed by attaching the flap 52 to the bottom of the tray, for example, by use of an adhesive to secure the flap to the bottom of the tray. Once the opening 50 is closed, a the complete tray and sleeve assembly is prepared and the assembly is ready for distribution in the marketplace. Of course, depending upon the packaging procedure used, the sleeve may be built around the tray after the tray is packed with food instead of inserting the tray into the completed sleeve.

After the tray 12 is packed and placed in the sleeve 16, the sleeve protects the tray and insures that the heat seal 14 will remain hermetically sealed to the rim 35. The sleeve protects the tray by acting as a protective layer during shipping and also when the tray is displayed on the shelf, freezer, refrigerator, or other display area. For this reason, the sleeve top 54 is typically a continuous piece that is free of any apertures other than the ports 60. In addition, once a customer purchases the assembly 10, there is no need to remove the tray from the sleeve until the food in the tray has been cooked. Thus, the consumer purchasing the tray and sleeve assembly is provided with a cooking apparatus which goes directly from shelf, freezer, refrigerator, etc. to the microwave oven. After the assembly 10 is purchased, the consumer simply places the assembly in his or her home pantry, freezer or refrigerator until the consumer wishes to cook the food in the tray.

When the consumer desires to prepare the food in the tray 12 for consumption, the consumer takes the tray and sleeve assembly 10 and places the entire assembly in a microwave oven. When the microwave oven generates radiant energy, it travels through the sleeve 16 and tray 12 and heats the food positioned in the tray 12. As the food positioned in the tray begins to heat and cook, the food gives off water vapor and steam is generated, thus increasing the temperature and building pressure within the hermetically sealed tray. As the pressure continues to build, the vents 40 direct the pressure at the tips 39 of the V-shaped indentations where the weakened portion of the heat seal is located. Because the size of the rim 35 is reduced at the tips 39 of the V-shaped indentations 38, the hermetic seal between the rim and the heat seal 14 is weakest at this point. Thus, pressure directed at the weakened portion of the seal causes the seal to break first at the tips 39 of the V-shaped indentations 38 as the heat seal pulls away from the rim. When the seal breaks, an opening in the seal is created and steam and heat escape from the tray at the tips of the V-shaped indentation. Because the ports 60 in the sleeve 16 are directly aligned with the V-shaped indentations 38, the steam escapes the assembly 10 through the ports 60. At the same time, the top 54 of the sleeve 16 rests against the heat seal 14 and keeps the heat seal in place upon the rest of the rim.

Because the top of the sleeve 16 is closely positioned to the rim of the tray, the top of the sleeve helps prevent complete removal of the heat seal from the rim along one side of the tray. In particular, it has been noted that if the tray is not held by the sleeve having ports positioned thereon, or if the ports are too large (e.g., extending for the entire length of the sidewall) a large seal opening is often created when pressure within the tray causes the heat seal to rupture at one of the V-shaped indentations. If the force of the steam escaping the tray in such a "blow-out" situation is great enough, the seal opening may extend along the rim for the entire length of one sidewall. This situation is not desirable because too much pressure and steam escape from the tray when a large seal opening is created between the heat seal and the tray. However, with the tray positioned properly within the sleeve, as taught by the present invention, the size of the seal opening is minimized when the seal first ruptures and steam blows through the seal at one of the V-shaped indentations. According to the present invention, the top of the sleeve and the size of the ports influence the size of the seal opening that is made when the heat seal ruptures at the V-shaped indentations. In particular, the size of the seal opening made when the heat seal ruptures is generally limited to the size of the slot because ruptures are limited along portions of the heat seal that are covered by the top of the sleeve. Thus, if less steam and/or pressure and a larger seal opening is desired for cooking a particular food product, the ports are made larger in size, and are cut to remove the top of the sleeve away from a large portion of the rim near the V-shaped indentations. If more pressure and a smaller seal opening is desired for cooking another food product, the ports are made smaller in size and are cut to remove little, if any, of the top of the sleeve away from the rim.

Because the assembly 10 allows steam to escape out of the V-shaped indentations 38 and ports 60 when the food in the tray 12 is cooked in a microwave oven, the assembly acts as a mini steam/pressure cooker. Some amount of pressure and steam is retained in the tray 12 during cooking and is used to cook the food to a desirable texture and temperature. At the same time, pressure and steam is released from the assembly 10 through the vents 40 and ports 60. As described above, the amount of pressure released from the tray during cooking is influenced by the number of vents positioned in each tray and the size of the ports formed in the cardboard sleeve.

An alternative embodiment of the invention is shown in FIGS. 5–9. In this embodiment, the apparatus 110 comprises a single compartment tray 112, made of plastic and transparent to radiant energy. The tray 112 comprises a bottom surface 126 with four sidewalls 131–134 extending therefrom to define a tray interior 128. A plurality of sinusoidal-shaped ribs 130 are raised from the bottom surface 126 to provide a cooking plane. The ribs terminate near the interior edges of the tray before reaching the four sidewalls. Sinusoidal-shaped steam channels 129 are formed between the ribs 130, such that steam produced while cooking food in the tray travels all around the food cooked in the tray, including underneath the food.

The four sidewalls 131–134 are bounded by a rim 135 which extends outward from and encircles the top of the four sidewalls. Vents 138 in the form of V-shaped indentations 138 are formed in the rim on two of the opposing sidewalls. The V-shaped indentations 138 extend into the rim 135 with the tip of the "V" ending just before the edge of the rim. Thus, a small portion of the rim 135 extends around each V-shaped indentation 138 such that the rim is continuous around the four sidewalls 131–134 and not completely interrupted by the V-shaped indentations. Unlike the embodiment of the invention shown in FIGS. 1–4, the vents in the embodiment shown in FIGS. 5–9 do not include a channel positioned underneath the V-shaped indentation. Instead, each of the V-shaped indentations 138 form a small V-shaped pocket under the heat seal 114 where the rim would otherwise be found. Each of the V-shaped indentations 138 are deep enough to cut slightly into the height of the sidewall immediately below the V-shaped indentation.

A skirt 136 depends from the edge of the rim 135 opposite the sidewalls. The skirt 136 terminates in a flange 148 that protrudes from the skirt. Dents 124 are formed in the skirt 136 and flange 148. The dents are positioned adjacent to each of the V-shaped indentations 138 on the rim 135, but a thin portion of the rim does extend between V-shaped indentations and dents 124. Thus, the rim 135 is continuous around each of the four sidewalls 131–134, although the rim is relatively thin between the V-shaped indentations 138 and the dents 124. The dents 124 extend down the skirt 136 and across the flange 148 and act as channels that direct steam down the skirt and across the flange when steam escapes from the tray near one of the V-shaped indentations 138.

A film heat seal 114 made of a food grade plastic film transparent to radiant energy is used to cover the tray 112. The heat seal 114 is hermetically sealed to the tray 112 along the rim 135 after food is packed in the tray.

Figure 8:
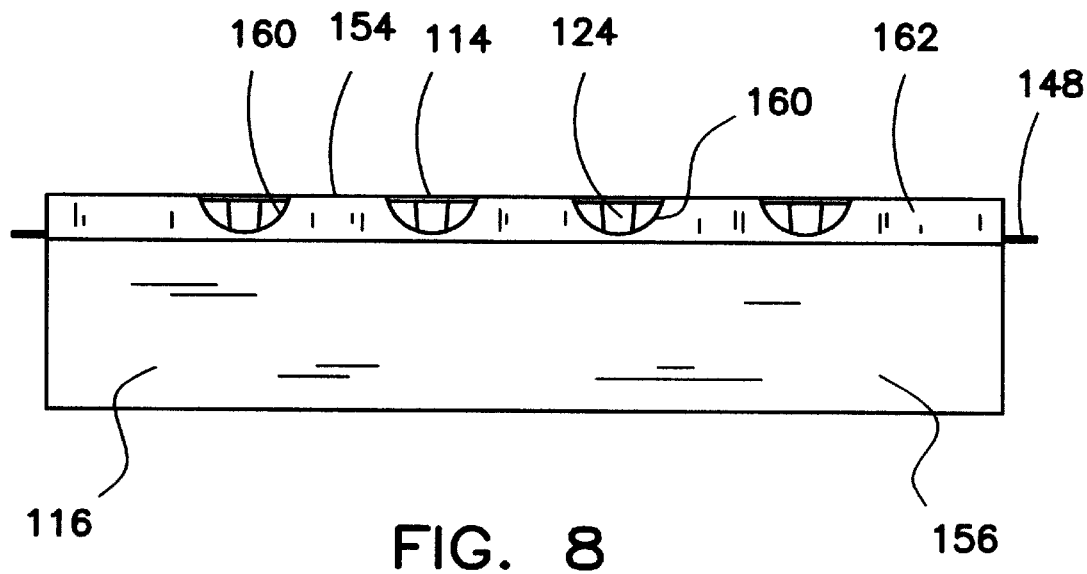
FIG. 8 shows a side view of the sleeve of FIG. 5 with the tray inserted into the sleeve.
Figure 9:
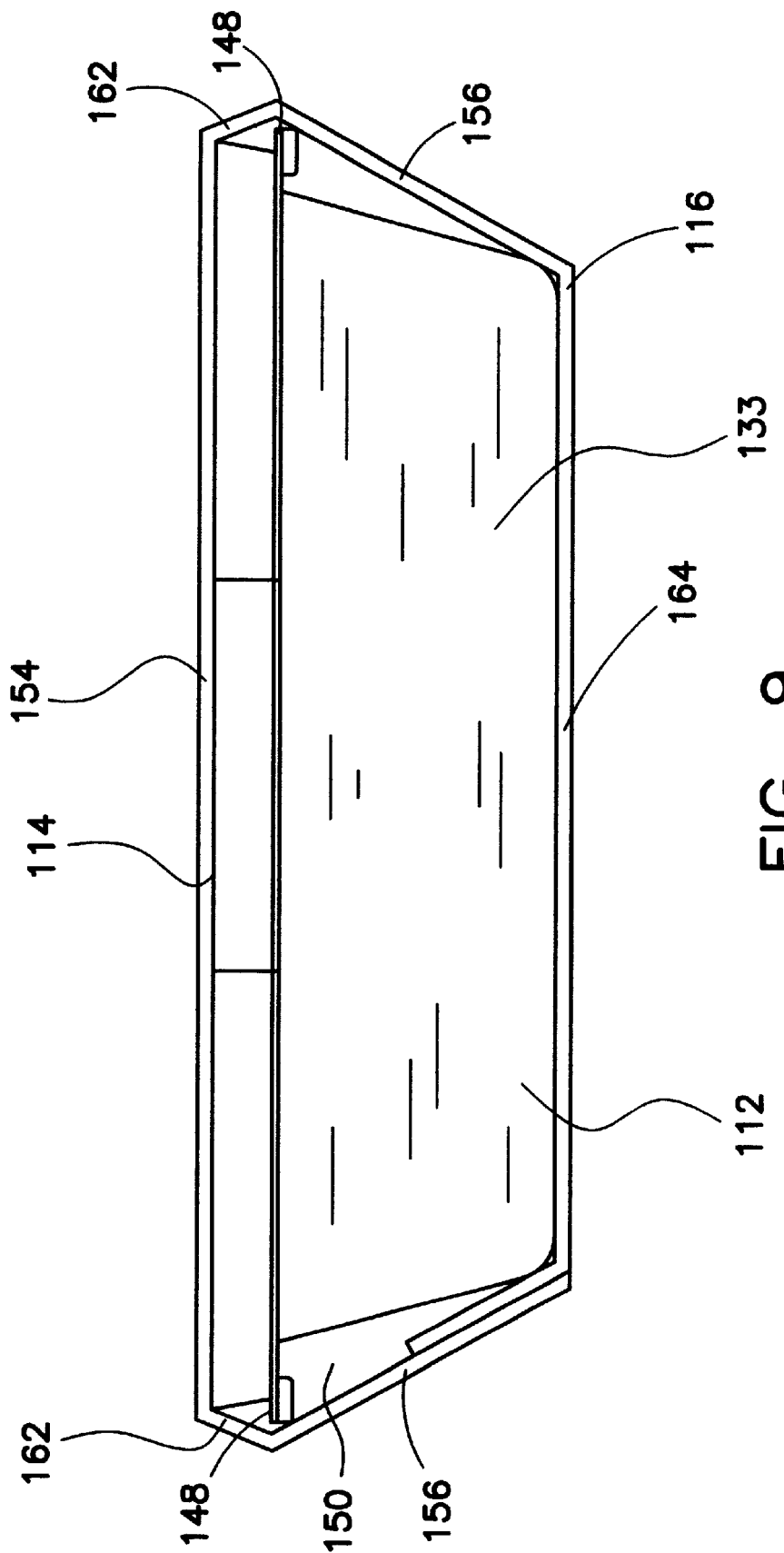
FIG. 9 shows another side view of the sleeve of FIG. 5 with the tray inserted into the sleeve and exposed through an opening in the sleeve.

The sleeve 116 is a cardboard or similar paper product that is transparent to radiant energy and designed to firmly hold the tray 112. As shown in FIG. 8, the sleeve in this embodiment of the invention has a substantially trapezoidal cross-section. The sleeve 116 includes a sleeve top 154, two beveled edges 162 positioned along the sleeve top, two sloped sleeve sides 156, and a sleeve bottom 164. Openings 150 are also provided at the front of the sleeve 116 and the rear of the sleeve for accepting the tray 112 into the sleeve. Ports 160 are placed in the sleeve along the beveled edges 162. The ports 160 also extend onto the top 154 of the sleeve and the two sloped sides 156. The ports 160 provide passages to allow steam to escape from inside of the sleeve 116 to the outside of the sleeve.

The sleeve 116 is designed to contain the tray 112 and snugly hold the tray within the sleeve. When the tray 112 is placed in the sleeve 116, the tips 139 of the V-shaped indentations 138 are aligned with and point to the ports 160 in the sleeve, as shown in FIG. 8. The top 154 of the sleeve 116 fits against the heat seal 112 which is sealed to the rim 135 of the tray. Also, the rim 135 is closely positioned to the beveled edges 162 of the sleeve 116 when the tray 112 is placed in the sleeve. Likewise, as best seen with reference to FIG. 9, the flange 148 is closely positioned to the sides 156 of the sleeve. The snug positioning of the tray 112 in the sleeve 116 provides very little room for the tray 112 to move in the sleeve 116.

The alternative embodiment of the invention shown in FIGS. 5–9 may be transferred directly from the freezer to microwave to prepare the food contained in the tray and sleeve assembly 110. As the food cooks in the microwave oven, heat and steam build within the tray 112. The pressure within the tray 112 causes the film 114 covering the tray to break away from the rim 135 at the tips of the V-shaped indentations 138, thereby venting steam and heat out of the holes created at the V-shaped indentations. The ports 160 in the sleeve allow the heat and steam to immediately vent out of the sleeve and into the atmosphere around the assembly. Furthermore, the positioning of the top 154 of the sleeve 116 against the heat seal 114 and the alignment of the ports 160 with the V-shaped indentations 138 influence the size of the seal openings created when the heat seal 114 breaks away from the rim 135 during cooking and prevents large portions of the heat seal from tearing away from the tray.

In yet another alternative embodiment of the invention, a rigid lid may be used in association with the tray. As shown in FIG. 10, the apparatus 210 includes a tray 212 having a rim 235 and four sidewalls 231–234. The tray further includes V-shaped indentations 238 positioned upon the rim 235. Each V-shaped indentation 238 is deep enough to cut slightly into the sidewall where the V-shaped indentation is positioned. A skirt 236 depends from the edge of the rim 235 opposite the sidewalls. The skirt 236 terminates in a flange 248 that protrudes substantially perpendicular to the skirt. Dents 224 are formed in the skirt 236 and flange 248. The dents are positioned adjacent to each of the V-shaped indentations 238 on the rim 235, but a thin portion of the rim does extend between V-shaped indentations and dents 224. Thus, the rim 235 is continuous around each of the four sidewalls 231–234, although the rim is relatively thin between the V-shaped indentations 238 and the dents 224. The dents 224 extend down the skirt 136 and across the flange 148 and act as channels that direct steam down the skirt and across the flange when steam escapes from the tray near one of the V-shaped indentations 238.

A heat seal 214 made of a food grade plastic film transparent to radiant energy is used to cover the tray 212. The heat seal 214 is sealed to the tray 212 along the rim 235 after food is packed in the tray. A lid 280 is provided to further cover the tray 212 and heat seal 214. The lid includes a top 282 and a lip 284. The lid 280 snaps over the rim of the tray 212 to secure it to the tray. When snapped on to the tray, the top 282 of the lid 280 rests on the rim 235 of the tray and the lip 284 of the lid rests on the flange of the tray.

The sleeve 216 is a cardboard or similar paper product that is transparent to radiant energy and designed to firmly hold the tray 212. As shown in FIG. 10, the sleeve in this embodiment is box shaped with sleeve sides 256 and an opening 250 provided at the front of the sleeve 216 for accepting the tray 212 into the sleeve. Ports 260 are located in the sleeve along the top of the sleeve sides 254. The ports 260 are created from small arcs 272 cut in the flattened cardboard before the sleeve it is constructed. When the cardboard is folded into a box shape to create the sleeve 260, including folds along the ends of the arcs 272, the arcs 272 extend from folded portions of the box and the ports 260 are formed directly under the arcs 272 along the top edges of the sleeve sides 156. The ports 260 provide passages from the inside of the sleeve 216 to the outside of the sleeve. Of course, the word "arc" as used herein is not intended to be limited to a shape defined by a segment of a circle, buy may also include other shapes such as segments of polygons, ovals, and other shapes such that folding along the ends of the shape will create a port adjacent to the shape. This method of creating ports is desirable for high quantity sleeve manufacturing environments where speed, simplicity of manufacture, and ease of automation are important factors.

The sleeve 216 is designed to snugly hold the tray 212. When the tray 212 is placed in the sleeve 216, the tips 239 of the V-shaped indentations 238 are aligned with and point to the top portion of the ports 260 in the sleeve. Likewise, the channels formed from dents 224 in the flange 248 are aligned with and extend toward the center of the ports 260 in the sleeve. The flange 248 also contacts the sleeve sides 256. If the lid 280 is included with the assembly 210, the lid is snapped on to the tray such that the lid top 282 rests on the rim 235 and the lid lip 284 rests on the flange 248. The top 254 of the sleeve 216 rests against the lid 280 when the tray 212 is positioned in the sleeve 216. The snug positioning of the tray 212 in the sleeve 116 provides very little room for the tray 212 to move in the sleeve 216.

When food is cooked in the tray 212 using a microwave oven, heat and steam are generated in the interior of the tray, causing pressure to build within the sealed tray. The pressure causes the heat seal 214 to rupture at one or more of the V-shaped indentations, causing heat and steam to pour from the seal opening. The heat and steam pouring from the seal opening is then directed through the slots 260 and out of the apparatus 210. If the lid 280 is being used with the tray, the heat and steam will cause the top 282 of the lid 280 to raise slightly above the rim 235, but the lip 284 of the lid will remain positioned upon the flange 248 of the tray when the heat seal 214 breaks away from the rim. With the top 282 of the lid raised above the rim 235 and a seal opening provided near the V-shaped indentation 238, the heat and steam travel along the channel created by the dent 124 and are directed out of the sleeve through the ports 260.

After cooking is completed using apparatus 210, the lid may be used to cover any portion of the food that has not been consumed for subsequent storage in the refrigerator. After storing the food in the container, the consumer may then use the same container to re-heat the food. After all of the food is finally consumed, the consumer may discard the tray. Thus, the consumer may use the apparatus 210 as not only a convenient container for cooking pre-packaged food, but also as a storage container for any left-overs, and a container for re-heating left-overs.

The previously described versions of the present invention have many advantages including, but not limited to, allowing consumers to quickly prepare microwave cooked food in the same container in which the food was packaged. At the same time, the present invention provides for a cheap and easy to produce container for preparing microwave cooked meals that are tasty and pleasing to the pallette. In addition, the invention provides for a disposable food container having a pressure relief system that can be easily modified so that different amounts of pressure are relieved from within the container depending upon the configuration of the tray and associated sleeve. Furthermore, the sleeve provides insulation from the heated tray when a human hand removes the tray and sleeve assembly from an oven. Also, the sleeve provides additional structure to the tray and supports the weight of objects in the tray so the tray does not accidentally fold and spill when it is removed from the oven.

Although the present invention has been described in considerable detail with reference to certain preferred versions thereof, other versions are possible. For example, the V-shaped indentations and vents may be differently shaped or differently arranged than provided herein, or additional vents may be included. In addition, the ports on the sleeve may be shaped or positioned differently than that described herein, such as circular ports positioned only on the top of the sleeve or only on the side of the sleeve. Also, the trays may include features such as nesting lugs that provide clearance between the trays when stacked to make the trays more compatible for use with high speed packing equipment. Furthermore, the tray and sleeve may include only a single sidewall or sides (e.g., circular shape) rather than plural sidewalls (e.g., box shape). These are but a few of the variations of the invention described herein, and other variations are possible. Therefore, the spirit and scope of the claimed invention should not be limited to the description of the preferred versions contained herein.

What is claimed is:

1. An apparatus for cooking food comprising:
   a. a tray comprising at least one sidewall bounded by a rim, said sidewall defining a tray interior;
   b. a heat seal attached to the rim and covering the tray interior;
   c. at least one vent positioned upon the rim of the tray, said vent creating a weakened portion on the heat seal; and
   d. a sleeve containing the tray therein, the sleeve including a sleeve top positioned snugly against the heat seal, thereby maintaining the heat seal and resisting pressure from within said tray interior during cooking, the sleeve further including at least one port aligned with said vent on the heat seal when the tray is retained within the sleeve, said port being only slightly larger than said vent, such that pressure from within said tray interior causes the heat seal to first rupture at said vent and aligned port.

2. The apparatus of claim 1, wherein said sleeve is transparent to radiant energy.

3. The apparatus of claim 1, wherein said sleeve top is free of any apertures other than ports aligned with respective vents positioned upon the rim of said tray.

4. The apparatus of claim 1, and further comprising a lid positioned between the heat seal and said sleeve top.

5. The apparatus of claim 1, wherein each vent comprises a V-shaped indentation formed in the rim of said tray and a channel extending beneath the V-shaped indentation and tapering into the sidewall of said tray.

6. The apparatus of claim 1, wherein each vent comprises a V-shaped indentation formed in the rim of said tray and forming a V-shaped pocket under the heat seal.

7. The apparatus of claim 1, wherein said tray further comprises a bottom surface, a plurality of ribs extending from said bottom surface to provide a cooking plane above said bottom surface.

8. A method of preparing a frozen dinner for subsequent sale, the method comprising the steps of:
   a. providing a tray having food positioned therein, said tray including a rim, at least one sidewall, and at least one vent positioned upon the rim of said tray;
   b. attaching a heat seal to the rim of said tray to hermetically seal the food in the tray, the heat seal having a weakened portion adjacent to said vent;
   c. providing a sleeve, including a sleeve top and at least one sleeve side connected to said sleeve top, said sleeve defining a port that is slightly larger than said vent; and
   d. placing said tray in the sleeve such that the sleeve top is positioned snugly against the heat seal, thereby maintaining the heat seal and resisting pressure from within said tray during cooking, and said port is aligned with the said vent, such that pressure from within said tray causes the heat seal to first rupture at said vent and aligned port.

9. The method of claim 8, wherein said sleeve is transparent to radiant energy.

10. The method of claim 8, wherein said sleeve top is free of any apertures other than ports aligned with respective vents positioned upon the rim of said tray.

11. The method of claim 8, wherein the step of providing the sleeve includes cutting an arc in a flattened piece of cardboard and folding the cardboard along the ends of the arc to create the port in said sleeve.

* * * * *